United States Patent [19]

Kamogawa et al.

[11] 4,054,918
[45] Oct. 18, 1977

[54] FILM SCANNING SYSTEM PROVIDING AUTOMATIC FRAME POSITIONING

[75] Inventors: Toshiro Kamogawa, Hirakata; Yoshifumi Teruuchi; Eiji Matsumoto, both of Katano; Akira Nishiyama, Neyagawa, all of Japan

[73] Assignee: Matsushita Electric Industrial Co., Ltd., Osaka, Japan

[21] Appl. No.: 534,843

[22] Filed: Dec. 20, 1974

Related U.S. Application Data

[63] Continuation of Ser. No. 344,205, March 23, 1973, abandoned.

[30] Foreign Application Priority Data

| Mar. 25, 1972 | Japan | 47-30199 |
| Mar. 25, 1972 | Japan | 47-30200 |
| July 14, 1972 | Japan | 47-71029 |
| July 14, 1972 | Japan | 47-71030 |

[51] Int. Cl.² .............................................. H04N 3/36
[52] U.S. Cl. .................................. 358/214; 358/216; 358/54
[58] Field of Search ................ 178/DIG. 28, 6.6 FS, 178/7.1, 7.2, 6.7 A; 360/10, 35; 352/169, 92, 236, 174, 176, 184; 358/54, 214-216

[56] References Cited

U.S. PATENT DOCUMENTS

| 3,622,235 | 11/1971 | Yamada et al. | 352/92 |
| 3,626,115 | 12/1971 | Watanabe | 178/6.6 |
| 3,627,922 | 12/1971 | Goldmark et al. | 178/7.2;DIG. 28 |
| 3,751,584 | 8/1973 | Pickering et al. | 178/DIG. 28 |
| 3,806,645 | 4/1974 | Faureau | 178/DIG. 28 |
| 3,851,959 | 12/1974 | Kreutze et al. | 352/169;92 |

*Primary Examiner*—John C. Martin
*Attorney, Agent, or Firm*—Stevens, Davis, Miller & Mosher

[57] ABSTRACT

There is provided an image reproduction system whereby a moving picture and a still picture can be selectively reproduced from a tape-shaped recording medium having images recorded thereon in sequential frames and which also enables simple and automatic frame aligning.

7 Claims, 12 Drawing Figures

MOVING PICTURE FRAME    STILL PICTURE FRAME

FILM SCANNING SYSTEM PROVIDING AUTOMATIC FRAME POSITIONING

This is a continuation of application Ser. No. 344,205, filed Mar. 23, 1973 now abandoned.

This invention relates to the selective display of moving picture and still picture in the electronic video recording system (EVR system) and also to the frame alignment.

In the accompanying drawing:

FIGS. 1 to 5 are views provided to assist the general description of the prior-art EVR system, and in which:

FIG. 1 is a view showing a EVR film;

FIG. 2 is a view showing part of the construction of the EVR system;

FIG. 3 is a view for illustrating the scanning of the EVR film;

FIG. 4 is a view showing means to derive the synchronous signal from the EVR film;

FIG. 5 is a view showing positional relation between EVR film and scanning raster;

In order for the invention to be fully understood, the prior-art EVR system will first be described with reference to FIGS. 1 to 5.

The EVR (electronic video recording) system is a video package system developed by Columbia Broadcasting Corporation (CBS) in the United States of America. In this sytem, a television signal is recorded on a monochrome film with an electron beam recorder (EBR), the record being used as master negative to produce copy prints, and the copy film which is accommodated in a cartridge is played back in a player, the reproduced monochrome or color video signal being displayed on the ordinary television receiver.

Figure 1:
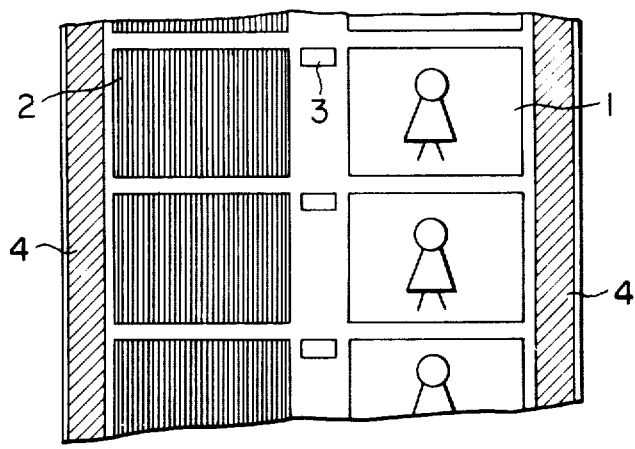

FIG. 1 shows a typical EVR film. The film is 8.75 mm wide and has two parallel image record tracks 1 and 2 in a set. In the track 1 the luminance signal is recorded, while in the track 2 the chrominance or color signal is recorded in an encoded form suited for recording and reproduction. Between both the tracks there is provided a synchronous (hereinafter referred to as sync) signal track, in which transparent sync signal marks 3 are recorded one for each frame. These marks are used as vertical sync signal at the time of the television image reproduction. Further, adjacent the opposite edges of the film there are provided magnetic recording tracks 4, in which the sound signal is recorded.

The EVR film of this construction is played back by moving it through a film drive means of the player at a predetermined speed (60 frames per second in the NTSC system and 50 frames per second in the PAL system) and raster scanning its face with a flying spot tube for reproducing luminance and chrominance signals through photomultipliers.

Figure 2:
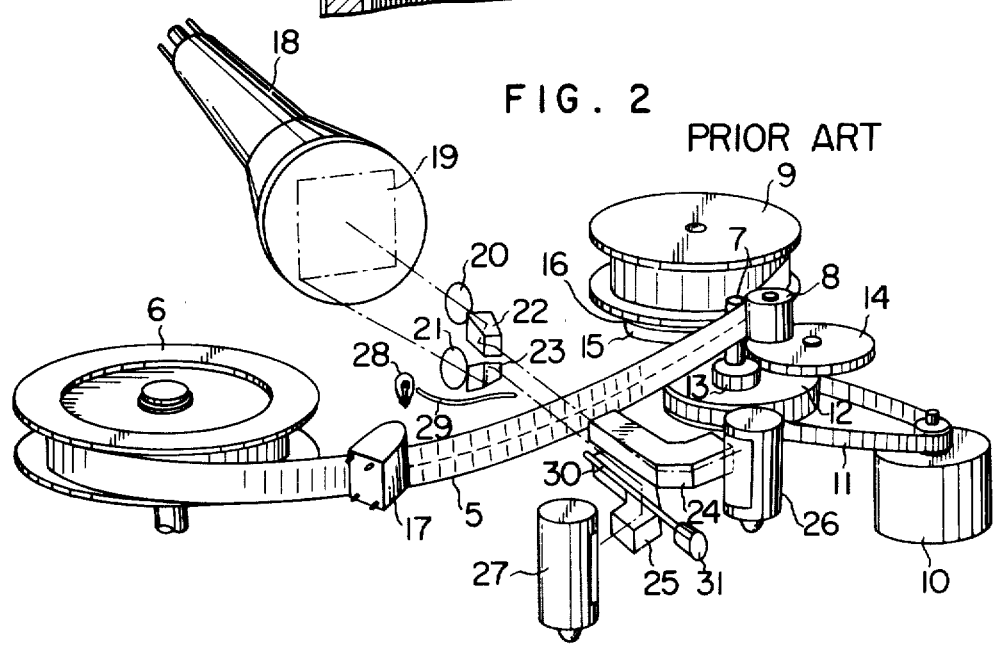
Figure 3:
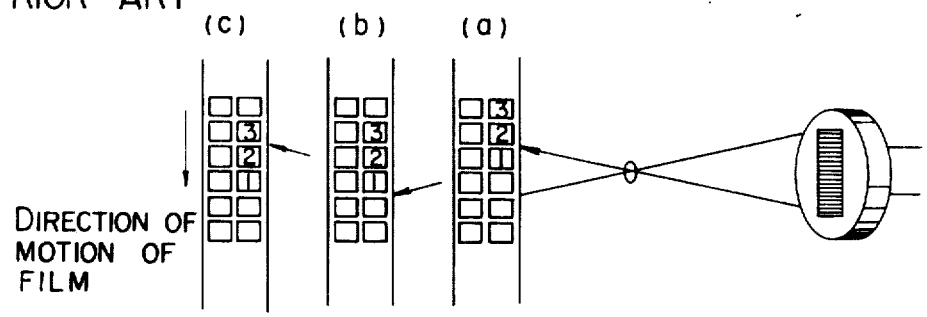

FIG. 2 shows an example of the film drive mechanism. In this example, the EVR film 5 is paid off its cartridge 6 at a predetermined speed by a capstan 7 and a pinch roller 8 and is taken up by a take-up reel 9. Numeral 10 designates a drive motor for driving the film drive system; its torque is transmitted via an endless belt 11 to a flywheel 18 to rotate the same and the capstan 7 integral therewith. A stepped portion 13 integral with the flywheel 12 also drives a reel roller 15 through a rubber roller 14. The rotation of the reel roller 15 is transmitted through a friction member 16 to the take-up reel 9 to rotate the same. By virtue of the presence of the friction member 16 the film drive may be stopped by merely stopping the rotation of the film cartridge 6 and releasing the pinch roller 8 without stopping the drive motor 10. Numeral 17 designates an audio signal reproduction magnetic head in contact with the film run.

The signal frames of the film is subjected to raster scanning with a flying spot tube 18. More particularly, the scanning raster area 19 is focused on a signal frame portion of the film through focusing lenses 20 and 21 and reflecting prisms 22 and 23. At this time one raster is focused on two adjacent frames through the two lens-prism sets. Light transmitted through individual frames has undergone intensity modulation according to the luminance and chrominance signals, and it is led through optical guides 24 and 25 to respective photoelectron multiplier tubes 26 and 27 to derive respective reproduced electric signals.

To obtain the sync signal, light from a light source 28 is led through an optical fiber 29 onto the sync signal track. Light transmitted through the sync signal mark is led as sync signal light through an optical pipe 30 to a photoelectric converter 31 such as a phototransistor to read it out as the sync signal. This sync signal is used as a vertical sync signal for the video signal, and it may also be used as a control signal for the speed control of the film run.

In order to read out signals by scanning the film frames fed in the afore-mentioned way with a rectangular raster, the raster size on the frame face is required to be double the frame dimension in the direction of progress of the frame, that is, the socalled "jumping scan system" where the scanning flying spot follows the frame being scanned must be adopted. The ground for requiring double the frame length for the vertical raster amplitude will now be made apparent by using FIG. 3. The vertical deflection started at the top of frame 1 as indicated by the arrow in film position $a$ reaches the bottom of the same frame as indicated by the arrow in film position $b$ after the lapse of one frame period. It will be seen that in order to start the vertical scanning of the next frame the flying spot should jump back to position $c$. Therefore, the vertical raster amplitude should be double the frame length, that is, the vertical scan speed should be double the speed of the film run.

Figure 4:
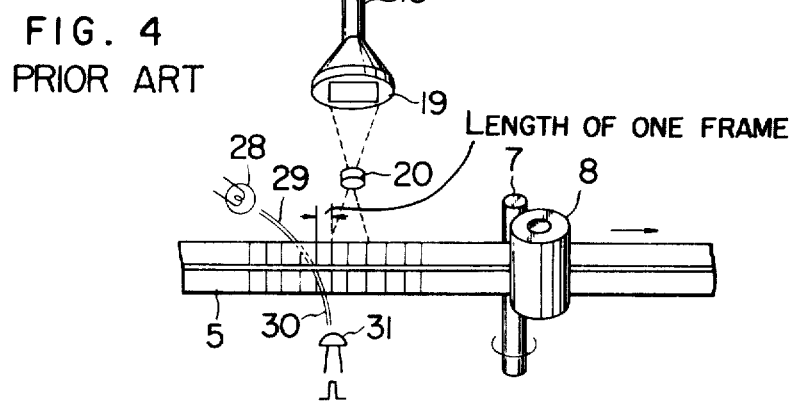
Figure 5:
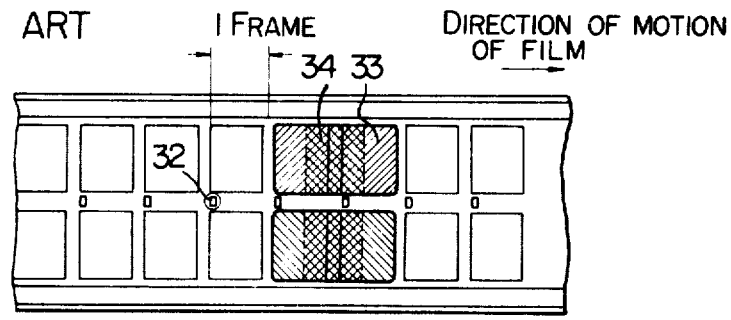

Regarding now the detection of the vertical sync signal, the sync signal detector is usually provided at a position spaced behind the associated scanning raster by just one frame length, as shown in FIG. 4. Theoretically, it may be distant from the raster by an integral multiple of the frame length. However, the greater the distance the synchronization is the more likely it is to be adversely affected by elongation or contraction of the film or by irregularity of sync signal pitch. Also, positioning the sync signal detector just adjacent the associated raster is prone to such difficulties as restrictions imposed by the mechanical construction. FIG. 5 shows in detail the raster position and the position of the associated sync signal mark. In the Figure, the shaded area 33 enclosed within the bold rectangular frame is the raster area having a dimension of double the frame length in the direction of motion of film or vertical scan direction. The associated sync signal detection position is provided on the sync signal track at a position spaced behind the raster by one frame length. If the vertical deflection is started with the vertical sync signal in this positional relation, the image frames may be correctly scanned.

While the EVR system enables the reproduction of a moving picture as mentioned above, it has another useful feature in that any desired frame can be stably reproduced as a still picture. Usually, a still picture is reproduced by stopping the film drive and reducing the vertical raster dimension to one half that in the case when the film is driven, that is, reduced to be equal to the frame length in order to scan only a single frame. At this time, the vertical sync signal is produced from a separate frequency standard, for instance an AC line, or from a separate oscillator. By so doing, one frame portion can be reproduced as a still picture. However, the frame position does not always coincide or is not always settled to be aligned to the raster position. In the case of misalignment, a so-called out-of-framing still picture extending over two adjacent frames would be reproduced. The frame alignment has usually been obtained by manipulating a manual film feed mechanism while watching the reproduced still picture. However, aligning the frame position every time a still picture is reproduced is very troublesome, particularly where still pictures are reproduced very frequently. Accordingly, it has been desired that the frame position be automatically aligned each time a still picture is reproduced.

It is an object of this invention to provide for automatic alignment of a signal frame on the EVR film and projection of the flying spot scanning tube raster on the film during still picture reproduction with the EVR player.

The image reproduction system according to the invention has the excellent features that moving pictures and still pictures can be selectively reproduced from a tape-shaped recording medium having images recorded in sequential frames and that simple and automatic frame alignment can be obtained.

The image reproduction system according to the invention will now be described with reference to FIG. 6 and the following Figures of the accompanying drawing.

1. FRAME ALIGNING MECHANISM EMBODYING THE INVENTION

Figure 6:
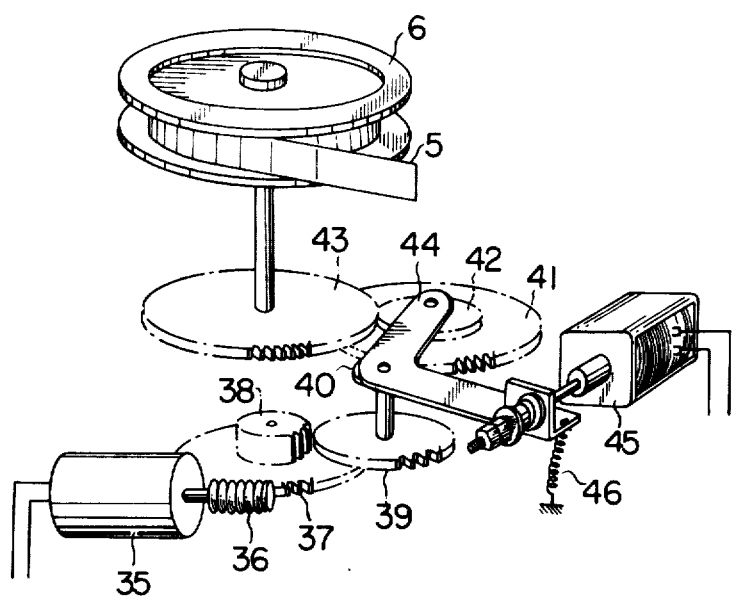
FIG. 6 is a view showing the construction of a drive means for driving a tape-shaped recording medium in an image reproduction system embodying the invention.

FIG. 6 shows a frame aligning mechanism embodying the invention. While the frame alignment has heretofore been obtained by manipulating a manual film feed mechanism, according to the invention it is effected with an auxiliary motor 35. The motor 35 is started in an interlocking relation to the action of the switching playback mode (for moving picture reproduction) over to the still mode (for still picture reproduction), and it is stopped by a frame alignment signal to be described hereinafter. The motor torque is transmitted through reduction gears 36 to 43 to film cartridge 6 to drive the same so as to feed film 5. This mechanism is provided in the illustrated disposition below the cartridge 6 which is the same as that shown in FIG. 2. The torque transmission gears 41 and 42 are carried by a lever 44 which is rotatable about the rotative shaft of the gears 39 and 40. The gears 42 and 43 can be brought into mesh with each other or demeshed from each other by the pivotal motion of the lever 44. The end of the lever 44 opposite the gears 41 and 42 is provided with a solenoid plunger 45 and spring biased with a spring 46. In the playback mode the solenoid plunger is held not energized or activated or operative, so that the lever 44 is held at a position to hold the gear 42 out of mesh with the gear 43 due to the pulling force of the spring 46. When this mode is switched over to the still mode, the solenoid is driven in an interlocking relation to the switching action to cause the pivotal motion of the lever 44 against the pulling force of the spring 46 so as to bring the gears 42 and 43 into mesh with each other. As a result, the torque of the motor 35 is transmitted to the cartridge 6. During the still mode, the solenoid plunger 56 is held activated or operative, while the pinch roller 8 is held apart from the capstan 7. When the playback mode is brought about again, the pinch roller 8 is brought into engagement with the capstan 7 via the film 5 to pay off the film at a predetermined speed.

It will be understood that with the above construction if the frame is out of alignment when the still mode is brought about, the film is fed by the auxiliary motor 35 at a suitable reduction ratio and at a suitable speed until the detection of alignment of the frame, whereupon the motor 35 is stopped. In this way, the automatic frame alignment can be obtained. The film feed speed at this time should not be excessively slow. Also, the reduction ratio is set such that the extent of overshoot or extra feed of the film due to inertial rotation of the motor 35 after the motor is switched off is sufficiently slight.

2. METHOD OF OBTAINING A CONTROL SIGNAL FOR CONTROLLING THE AUXILIARY MOTOR

The frame alignment signal can be most simply and conveniently produced by utilizing a signal derived from the vertical sync signal detector in the sync signal track similar to the case of the playback mode. In other words, after switching over to the still mode the auxiliary motor 35 may be stopped as soon as an output due to alignment of frame sync window or aperture and sync signal detection position is obtained. If this method is directly employed, however, the still reproduction picture would be deviated by just half a frame. This will be apparent from FIG. 5. FIG. 5 shows that the film is stopped just when the sync signal detection position 32 is aligned to the sync signal mark. At this time, the raster size is reduced for the still reproduction to one half that during the playback mode, that is, the vertical sawtooth scan amplitude is reduced to one half. This means that the still mode raster is positioned at the center of the playback mode raster as shown cross-shaded and enclosed by a dashed rectangle, so that the scanning will be done over two adjacent frames for one half for each. As a result, the reproduced image is deviated by one half the frame length.

2-a. FIRST MEASURE AGAINST NON-ALIGNMENT OF STILL PICTURE FRAME OF THE FILM RELATIVE TO RASTER POSITION

As a first method for precluding the nonalignment the position of the raster on the flying spot tube may be shifted just by one half the frame length in the vertical scan direction. This may be readily done by impressing a d-c current or d-c voltage of a requisite amplitude as d-c bias upon the vertical deflection coil or deflection electrode of the flying spot tube. Alternatively, a d-c current may be produced through an auxiliary deflection yoke specially provided for the shift. In this way, by reducing the vertical raster amplitude to one half that during the playback mode and shifting the raster position by one half the frame length simultaneously with the switching over to the still mode, still reproduction of a correctly aligned frame may be obtained.

2-b. SECOND MEASURE AGAINST NON-ALIGNMENT OF STILL PICTURE FRAME OF THE FILM RELATIVE TO RASTER POSITION

Figure 7:
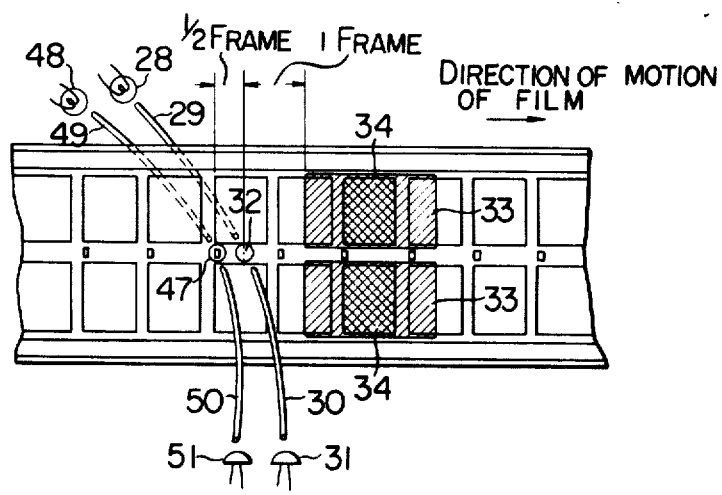
FIG. 7 is a view for assisting the description of one embodiment of the image reproduction system according to the invention.

A second measure against non-alignment has resort to the provision of an additional sync signal detection means which is placed in a position being corresponding to the position 47, as shown in FIG. 7. More particularly, a still picture frame alignment detection means is provided for detecting a sync signal detection mark such as the one placed at the position 47 spaced from the position of the playback mode sync signal detection means 32 by one half the frame length or an odd number multiple thereof. Also, similar to the sync signal detection means placed at the position 32 a light source 48, an optical fiber 49, an optical pipe 50 and a photoelectric converter 51 such as a phototransistor are provided for the additional detection means placed at the position 47. The output of this detection means is adapted to be interlocked to the operation of switching over to the still mode such that it is "on" only during the still mode and is "off" during the playback mode, and the auxiliary motor 35 is adapted to be switched off by this output. By so doing, even if the vertical raster amplitude is reduced to one half when the film is stopped as a sync signal mark is detected by the detection means corresponding to the position 47 the frame and raster will be aligned as shown by the cross-shade 34 in FIG. 7. Thus, still reproduction of a correctly aligned frame may be obtained. In the playback mode the sync signal is derived from the sync signal mark at the position 32. Also, in this case the two light sources 28 and 48 may be replaced with a single light source, for instance one 28, for common use. In other words, light from a common light source may be led to the detection positions 32 and 47 through the respective optical fibers 29 and 49.

Figure 12:
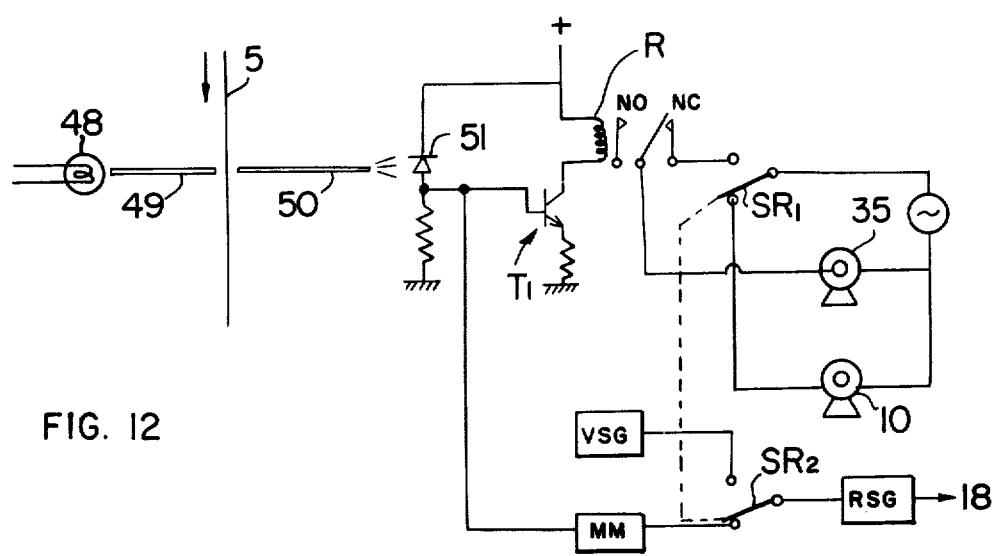
FIG. 12 shows a typical control circuit for controlling still picture frame alignment.

A typical circuit for controlling the operation of the auxiliary motor 35 in the still picture reproduction mode is shown in FIG. 12. As described above, when still picture operation is desired, the power supply to the main drive motor 10 is cut off and power is supplied instead to the auxiliary motor 35 by means of a first section SR, of a still reproduction switch through the normally closed contact of a relay R. The auxiliary motor 35 rotates feeding the EVR film 5 through the film gate at a low speed. Light from source 48 illuminates the photo detector 51 and, upon detection of the synchronizing signal mark, current flows through the photo-detector. This current is amplified by transistor $T_1$ to operate the relay R causing the movable contact member to switch from the normally closed contact NC to the normally open contact NO. Consequently, the power supply to the auxiliary motor 35 is cut off and motor 35 stops with the frame in proper alignment.

The sync signal which is detected by the photo-detector 51 is delayed by means of a monostable mulivibrator MM for a period equal to that required for the film to run at a constant speed when reproducing a moving picture for a distance one-half $l$ or a length which is an odd number multiple of one-half $l$, where $l$ is the distance from the leading end of a moving picture frame to that of a succeeding adjacent moving picture frame. The delayed sync pulses are coupled through a second section $SR_2$ of the still reproduction switch to a sawtooth wave raster scan voltage generator RSG for raster scanning the flying spot tube 18 so that it will operate in synchronism with the delayed sync pulses. A vertical sync signal generator VSG is coupled to the saw-tooth generator RSG through section $SR_2$ of the still reproduction switch.

Sections $SR_1$ and $SR_2$ of the still reproduction switch are interlocked as shown in FIG. 12. When the switch is in the position shown, the system is in the moving picture reproducing mode in which the film feeding motor 10 is rotating and the flying spot scanner tube 18 is scanned by the delayed sync signal from the film 5. When $SR_1$ and $SR_2$ are switched, the system is in the still picture reproducing mode in which the auxiliary motor 35 is rotating and the raster scan is produced by the still picture vertical sync signal generator VSG.

2-c. THIRD MEEASURE AGAINST NON-ALIGNMENT OF STILL PICTURE FRAME OF THE FILM RELATIVE TO RASTER POSITION

As a third method for precluding the nonalignment, which is a modification of the second method, the sync signal detection means for the playback mode together with the associated light source 28, optical fiber 29, optical pipe 30 and photoelectric converter 31 may be dispensed with, and the detection means placed at the position 47 alone may be utilized both for the production of the frame alignment signal at the time of the still reproduction and for producing the vertical sync signal in the playback mode. In this case, however, the output pulse detected as the vertical sync signal is delayed for a period corresponding to one half the frame length, for instance one-sixtieth × one-half second in case of a film speed of 60 frames per second, and the delayed signal is used as the sync signal to start the raster scanning. Since the film speed in the playback mode is constant, the delayed signal delayed by this delay time is equivalent to a sync signal derived at position 32 one half the frame length apart from the position of detection of the non-delayed signal, so that aligned picture reproduction may be obtained in the playback mode.

While the frame alignment at the time of switching playback mode over to still mode has been described above, it is to be noted that the frame alignment may also be obtained when the still reproduction of a certain frame is followed by the still reproduction of the next frame or the still reproduction of a frame apart from the previous one or more frames. More particularly, in the still mode with the auxiliary motor 35 held "off" by the output signal from the sync signal mark, by temporarily switching off the output signal by means of a manual switch the motor 35 will be started to begin the feeding of the film. As a result, the output from the sync signal mark vanishes. Then, by turning on the manual switch again as soon as this state sets in, the film will be stopped when an output appears from the sync signal mark for the next frame, so that the still reproduction of the next frame can be obtained. Also, it will be apparent that by leaving the manual switch "off" for a longer period, the film can be fed for more than one frame.

As has been described, according to the invention at the time of the still reproduction an aligned frame image can always be automatically obtained, eliminating the necessity of tedious manual operation of the prior art frame alignment, which is particularly beneficial where still pictures are reproduced very frequently. Also, with the mechanism according to the invention it is possible to reproduce successive frames each as still picture, so that it is very useful when it is utilized as a search system for examining recorded information frame by frame.

While the foregoing description has been concerned with the EVR system, the same principles can of course be applied to frame image recording and reproducing systems other than but similar to the EVR system used for the reproduction of moving and still pictures.

3. AUTOMATION OF STILL OPERATION AND FRAME ALIGNING

In the description so far the automatic frame alignment is obtained when the operator of the player selects a desired moving picture frame in a program to be displayed as still picture. However it has been desired, particularly for educational purposes, that not only moving picture frames but also frames intended to be reproduced as still picture be suitably inserted within the program content and that the moving picture reproduction mode be automatically switched over to the still picture reproduction mode when a still picture frame reaches the scanning position.

Figure 8:
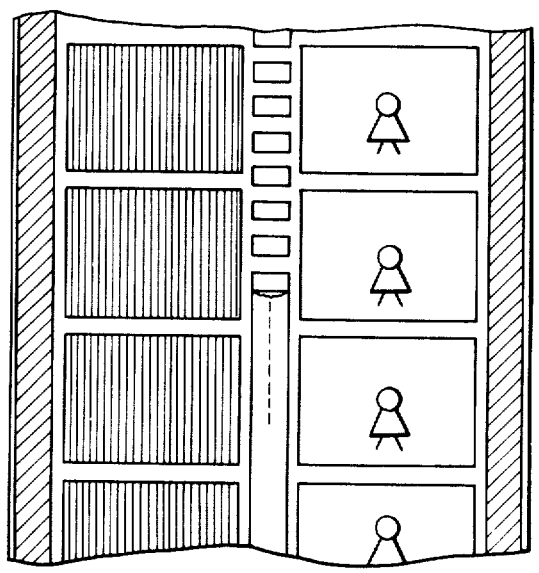
FIG. 8 is a view showing an example of the prior-art EVR film.

To obtain such automatic switching and frame alignment, it is usual to previously record at requisite positions of the record film particular control signals, i.e., autostill signals, so that the player operation modes may be automatically switched upon detection of this signal. FIG. 8 shows an already proposed record film having autostill signals recorded thereon. In this film, an autostill signal consisting of alternate black and white portions at a constant pitch are recorded in the sync signal track. The black portion blocks light, while the white portion transmits light, so that an output having a predetermined frequency is obtained from the sync signal detector. Since the film speed is constant, it is ensured to obtain an output at a particular fixed frequency. This alternate signal is recorded over an appropriate section preceding the associated autostill frame intended to be reproduced as a still picture. When this alternate signal section following the normal moving picture frame section reaches the sync signal detection, a signal at a particular frequency is obtained from the detector, so that the operation mode switching mechanism of the player is actuated in response to the detection of this frequency. To this end, however, a frequency discriminator is required, and thus the construction of the system becomes complicated.

Figure 9:
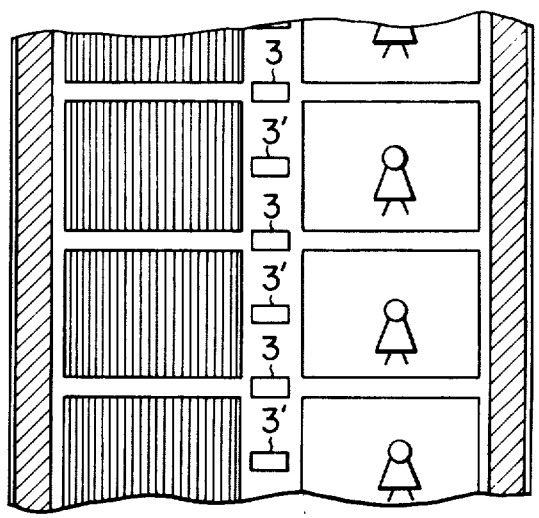
FIG. 9 is a view showing a tape-shaped recording medium embodying the invention.

Now, it will be described with respect to a means enabling to employ autostill signal in a very simple way in the automatic switching and frame alignment mechanism using two said sync signal detecting means. In the film, additional sync signal marks 3' are provided mid way between adjacent ordinal frame sync signal marks 3 as shown in FIG. 9. In other words, there is provided a series of sync signal marks spaced at a pitch just corresponding to one half the frame length. This is used as an autostill signal in place of the alternating signal shown in FIG. 8. For the detection of this signal series use is made of two signal signal detectors spaced apart by a center-to-center distance equal to one half the frame length or an odd multiple thereof. With this arrangement, an autostill mechanism may be actuated when output signals from these two detectors are simultaneously obtained.

The autostill signal pattern as shown in FIG. 9 may be recorded and detected more readily and simply compared to the alternating signal pattern shown in FIG. 8. By employing the autostill signal, various effects can be obtained, such that in the former case it is necessary to record sync signals of the same form as the ordinary sync signal marks midway between adjacent ones thereof, and there is no need of separately providing any alternating signal pattern. Also, for detection no frequency discriminator is required but only a two-input coincidence circuit is required.

4. AUTOMATIC STILL OPERATION AND FRAME ALIGNMENT WITHOUT CHANGING THE RASTER SIZE

Figure 10:
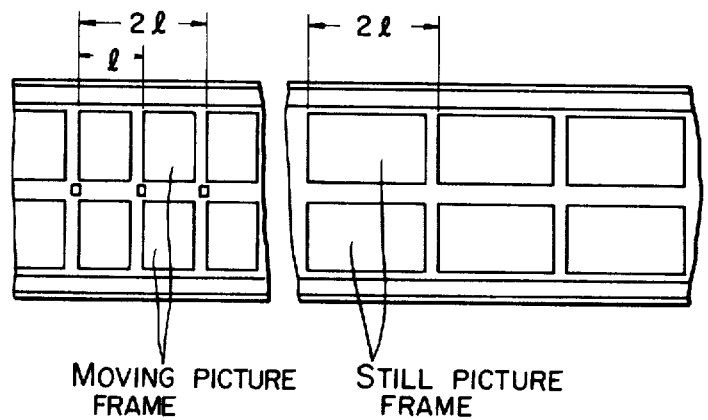
FIG. 10 is a view showing a presently proposed tape-shaped recording medium.

FIG. 10 shows one of the films, in which autostill reproduction frames having, unlike the ordinary moving picture frames, a dimension which is twice as long as that of the ordinary frame in the vertical scan direction are recorded and a method to record one picture in this autostill reproduction film is proposed. This kind of frame is adopted in order to reproduce the still picture with the scanning raster in the ordinary moving picture reproduction mode. In the moving picture reproduction mode the size of the scanning raster is equal to double the frame size on the film in the vertical scan direction because of the necessity of the jumping scan. Accordingly, in order to be able to correctly reproduce a still picture frame without changing the scanning raster size the still picture frame should have the same size as the scanning raster. From this ground, the frame for exclusive use in still reproduction need have double the length of the ordinary moving picture frame.

FIG. 10 shows a film, where the autostill reproduction frame has the same size as the raster and the moving picture frame. One of the grounds for increasing the size of the autostill reproduction frame to twice as large as the moving picture frame and not adopting the method of contracting the scanning raster size to one half for the still reproduction resides in that contraction of the scanning raster size is likely to result in burns in the contracted raster portion of the phosphor screen of the flying spot scanning tube. In other words, the brightness in the contracted raster portion is likely to become lower than the brightness of the rest of the phosphor screen due to the deterioration of the screen in that portion. If this results, uniformity of brightness will be lost at the time of the moving picture reproduction. This also applies where a moving picture is reproduced as a still picture. In this case, however, the period of the still reproduction is usually comparatively short. On the other hand, in the case of automatic the still operation still picture frame is often reproduced for a comparatively long time for detailed explanation or observation, so that burns are far more likely to result and the measure against the burns is more serious. A second ground resides in that it is desired that a frame to be used exclusively for still reproduction provide higher resolution. The still picture often requires more detail compared to the moving picture. Accordingly, the same raster size as in moving picture reproduction is adopted in still picture reproduction to the end of avoiding deterioration of the resolution due to contraction of the raster size.

Figure 11:
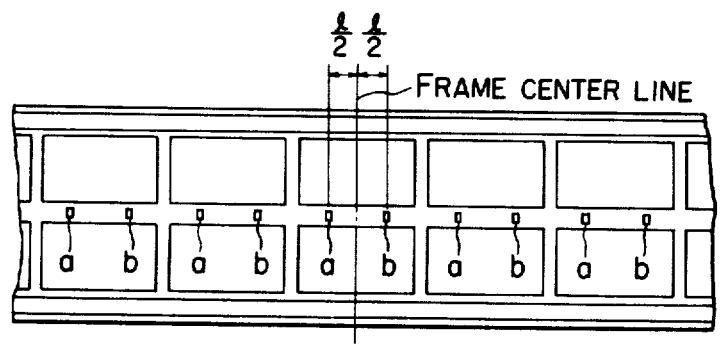
FIG. 11 is a view showing a further tape-shaped recording medium embodying the invention.

The film shown in FIG. 11 is provided with sync signal marks for automatic frame alignment in case of reproducing a still picture as mentioned earlier, the sync signal marks being recorded in the sync signal track at positions spaced from the center line of the scanning raster normal to the vertical scan direction by one half the frame length or an odd multiple thereof. These sync signal marks may also be utilized for automatic frame alignment in the autostill operation. To this end the sync signal marks may be provided as autostill frame sync signal on the sync signal track of the film at positions corresponding to the afore-mentioned position of detection of the alignment of the autostill frame and scanning raster. While the positions of the sync signal marks are spaced from the center line of the associated autostill frames by an odd number multiple of $l$ ($l/2$ being the distance from the leading end of a moving picture frame to the leading end of the next and adjacent moving picture frame), those sync signal marks being to either series $a$ or series $b$, as shown in FIG. 11. Either one of these series is selectively used depending upon the position of the sync signal marks relative to the sync signal detection position. This also means that the position of the detector may be determined to suit either series $a$ or series $b$.

It will be understood that by recording sync signal marks within the autostill frames it is possible to effect automatic frame alignment by a common detector provided commonly for both moving picture frames and autostill frames, which is very useful in reproduction as still picture.

What we claim is:

1. Apparatus for reproducing image information recorded in sequential frames on a tape-shaped reproducing medium in continuous motion and standstill modes, said reproducing medium having synchronizing signal marks located between adjacent frames of the recorded image information, said apparatus comprising:
   first drive means for driving said reproducing medium past a reproducing station at a constant rate;
   reproducing means located at said reproducing station for frame-by-frame reproducing said image information signals recorded in said continuous motion mode, including:
     means for scanning each frame driven past said reproducing station,
     synchronizing signal mark detection means located at a position such that, if a raster scan for reproducing a moving picture is started when the sync signal mark is detected at this position, the scan is begun from a position which is spaced from the leading edge of a picture frame by an odd number multiple of $l/2$, where $l$ designates the distance from the leading edge of a first moving picture frame to the leading edge of a succeeding adjacent moving picture frame, and
     means for delaying the start of said scan when the detecting means detects a synchronizing signal mark for a period of time in which the reproducing medium moves a distance which is an odd number multiple of one-half $l$, said means for delaying operating only in said continuous mode;
   means for stopping said first drive means in said standstill mode; and
   means for reproducing a signal frame from said reproducing medium in said standstill mode, including:
     said scanning means,
     said synchronizing signal mark detection means,
     second drive means energized in said standstill mode and de-energized in said continuous motion mode for aligning said reproducing medium with said scanning means in said standstill mode, and
     means responsive to the detection of a synchronizing signal mark by said detection means for reducing the size of a raster scanned by said scanning means to one-half the raster size in said continuous motion mode,
     wherein said second drive means is de-energized upon detection of said synchronizing signal mark by said detection means.

2. Apparatus for reproducing image information recorded on a tape-shaped reproducing medium, said reproducing medium having synchronizing signal marks thereon, said apparatus comprising:
   means for feeding said reproducing medium past a reproducing station at a constant rate;
   means located at said reproducing station for frame-by-frame reproducing said image information signals recorded on said tape-shaped recording medium;
   means for stopping said feeding means for reproducing a single frame from said reproducing medium in a standstill mode;
   means responsive to at least one of said synchronizing marks for producing a control signal;
   auxiliary drive means responsive to said control signal for aligning said reproducing medium with said frame-by-frame reproducing means in said standstill mode;
   means for switching from said feeding means to said auxiliary drive means in said standstill mode;
   a first sync signal mark detection means for detecting sync signal marks at the time of reproducing moving pictures, and
   a second sync signal mark detection means provided at a position spaced from said first sync signal mark detection means by one half of $l$, where $l$ designates the distance from the leading end of a moving picture frame to that of a succeeding adjacent picture frame.

3. An apparatus according to claim 2, wherein a further sync signal mark is provided between two adjacent moving picture reproduction sync signal marks and preceding said still picture reproduction frame; said apparatus further comprising means to switch from said feeding means to said auxiliary drive means when both of said first and second sync signal mark detection means detect a predetermined pattern of said sync signal marks.

4. An image reproduction system according to claim 2, further comprising means to stop said auxiliary drive means upon detection of a moving picture reproduction sync signal mark by said second sync signal mark detection means.

5. An apparatus according to claim 4, wherein said tape-shaped recording medium has a still picture reproduction frame having a dimension twice as long as that of the moving picture frame taken in the running direction of the tape and also has sync signal marks formed in a synchronization track at positions leftwards or rightwards from the center of the respective still picture reproduction frames by one half of $l$.

6. An apparatus according to claim 2, wherein said tape-shaped recording medium has a still picture reproduction frame having a dimension twice as long as that of the moving picture frame taken in the running direction of the tape and also has a single sync signal mark at a position spaced from the end of a moving picture scanning frame by a length which is an odd number multiple of one half the frame, said apparatus further comprising means to stop said auxiliary drive means when said second sync signal mark detection means detects said single sync mark.

7. Apparatus for reproducing image information recorded on a tape-shaped reproducing medium, said reproduction medium having a synchronizing signal mark located at a position spaced from the end of an image information frame by a length which is an odd number multiple of one-half said frame, said apparatus comprising:

means for feeding said reproducing medium past a reproducing station at a constant rate;

means located at said reproducing station for frame-by-frame reproducing said image information signals recorded on said tape-shaped recording medium;

means for stopping said feeding means for reproducing a single frame from said reproducing medium in a standstill mode;

means responsive to said synchronizing signal mark for producing a control signal for the still frame alignment of said reproducing medium in said standstill mode;

auxiliary drive means responsive to said control signal for aligning said reproducing medium with said frame-by-frame reproducing means in said standstill mode; and means to delay said control signal for a time corresponding to one-half $l$ or an odd number multiple thereof at the time of reproducing said image information frames in a continuous motion mode, where $l$ designates the distance from the leading edge of one image information frame to that of a next adjacent information frame, said delayed signal being applied to said reproducing means as a vertical synchronizing signal.

* * * * *